United States Patent
Paracha et al.

(10) Patent No.: US 9,830,573 B2
(45) Date of Patent: Nov. 28, 2017

(54) RETAIL INVENTORY MANAGEMENT SERVICES THROUGH PERSONAL MOBILE DEVICES

(71) Applicant: Wal-Mart Stores, Inc., Bentonville, AR (US)

(72) Inventors: Zulfiqar Ali Paracha, Rogers, AR (US); Aaron Santavicca, Bentonville, AR (US); Josh Osmon, Bentonville, AR (US); Doyle Reece, Bentonville, AR (US); Kishore Kumar Konate, Bentonville, AR (US); Vidanage Prabuddha Mangala Chandrasiri, Bentonville, AR (US); Mahesh Sundar Thangaraj, Bentonville, AR (US); Jie Ouyang, Auburn Hills, MI (US); Kevin E. Hill, Bentonville, AR (US); Michael Shawn McGuire, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 370 days.

(21) Appl. No.: 13/895,538

(22) Filed: May 16, 2013

(65) Prior Publication Data
US 2014/0344116 A1 Nov. 20, 2014

(51) Int. Cl.
*G06Q 10/08* (2012.01)
(52) U.S. Cl.
CPC .................................. *G06Q 10/087* (2013.01)
(58) Field of Classification Search
None
See application file for complete search history.

(56) References Cited

U.S. PATENT DOCUMENTS

| | | | | |
|---|---|---|---|---|
| 6,325,283 | B1* | 12/2001 | Chu et al. | 235/375 |
| 6,961,586 | B2 | 11/2005 | Barbosa et al. | |
| 7,118,036 | B1* | 10/2006 | Couch et al. | 235/385 |
| 7,434,730 | B2* | 10/2008 | Jain | 235/380 |
| 7,693,757 | B2* | 4/2010 | Zimmerman | 705/28 |

(Continued)

OTHER PUBLICATIONS

Motorola Corporation, "Motorola Product Spec Sheet: The Motorola MC55A0 Series" (2010).

(Continued)

*Primary Examiner* — Fateh M Obaid
(74) *Attorney, Agent, or Firm* — Fitch, Even, Tabin & Flannery LLP

(57) ABSTRACT

A system is disclosed for providing retailer controllable access to consolidated inventory management services through a retail worker's personal smartphone. The system—operable largely within and through the retailer's private computing network—comprises data nodes, an enterprise service bus, and a device application. Inventory-related data is kept in the data nodes, with access thereto from suitably provisioned personal mobile devices moderated by the enterprise service bus pursuant to policies and parameters defined by the retailer. Provisioning the personal mobile device involves installation thereon of the device application. The device application launches a user interface for accessing the data nodes through the enterprise service bus, thus enabling the use on the worker's personal mobile device of retailer-specific, job-related inventory management tools.

16 Claims, 1 Drawing Sheet

(56) References Cited

U.S. PATENT DOCUMENTS

| | | |
|---|---|---|
| 7,899,823 B1 | 3/2011 | Trandal et al. |
| 8,112,434 B2 | 2/2012 | Patten, Jr. et al. |
| 8,156,140 B2 | 4/2012 | Roshen et al. |
| 8,225,375 B2 | 7/2012 | Tsuchiya et al. |
| 8,265,970 B2 | 9/2012 | Conroy et al. |
| 8,374,926 B2 * | 2/2013 | Solomon .......................... 705/28 |
| 2003/0036977 A1 | 2/2003 | Morse |
| 2006/0074777 A1 | 4/2006 | Anderson |
| 2007/0181681 A1 * | 8/2007 | Jain ............................... 235/385 |
| 2008/0077511 A1 * | 3/2008 | Zimmerman .................... 705/28 |
| 2009/0192924 A1 * | 7/2009 | Ku ................................. 705/28 |
| 2010/0106515 A1 * | 4/2010 | McCoy ............................ 705/2 |
| 2011/0032078 A1 | 2/2011 | Guziel et al. |
| 2011/0125821 A1 | 5/2011 | Roshen |
| 2011/0302051 A1 | 12/2011 | Arbatti |
| 2012/0123884 A1 | 5/2012 | Shasin |
| 2012/0202515 A1 | 8/2012 | Hsu et al. |
| 2012/0227082 A1 | 9/2012 | Fot et al. |

OTHER PUBLICATIONS

Oracle Corporation, "Oracle Retail Store Inventory Management: Handheld Terminal Quick Reference Guide", Release 12.0 (Sep. 2007).

International Search Report and Written Opinion, received in PCT/US14/38334 (dated Oct. 3, 2014).

\* cited by examiner

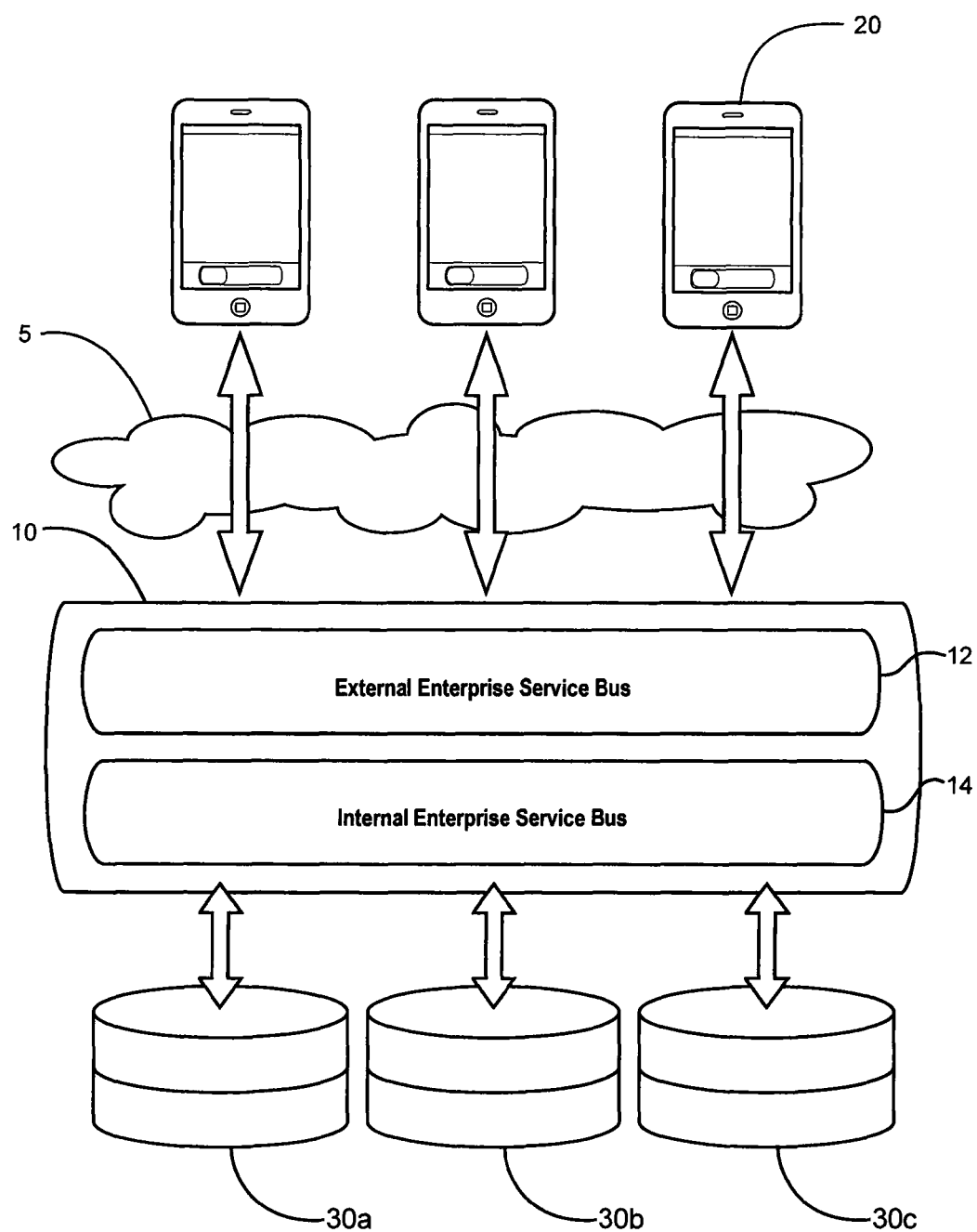

RETAIL INVENTORY MANAGEMENT SERVICES THROUGH PERSONAL MOBILE DEVICES

FIELD

The present invention relates in general to inventory management systems, and in particular, to a retail inventory management system accessible from personal mobile devices.

BACKGROUND

The management of inventory in retail facilities is a critical business function, the execution and efficiency of which often has substantial impact on a retailer's financial performance. In a broad sense, inventory management involves the monitoring, control, and review of the handling, identifying, cataloguing, and counting of items of retail merchandise. Executed by a team of retail workers and their managers, common inventory management tasks include, for example, unloading merchandise delivered to a retail facility, inspecting and recording deliveries, stocking and restocking shelves, retrieving merchandise from storage to fill a customer order, pricing and labeling merchandise placed out on shelves, performing price and inventory checks, and generating and reviewing inventory reports, assignments, and staffing.

Inventory in large retail facilities—such as those operated by the well known national and international retail chains—can be copious, diverse, and fluid. Handling and attending to inventories at such scale and complexity can be daunting, requiring a large well-trained staff equipped with tools that provide them with access to the inventory-related information needed to perform their duties. It would not be uncommon in large retail organization for inventory-assigned workers (such as, "pickers", "stockers", "porters", "clerks", and their managers) to constitute a majority among total retail facility employees.

It is a current practice within retail facilities to provide each worker that requires access to inventory-related data with a handheld optical bar code scanner specifically developed and sold for commercial retail use. As essentially "niche" devices, these scanners tend to be sold at a comparatively high price, which is borne by the retailer together with the associated and necessary training costs. Multiplied by each worker in need of such scanner, across each facility operated by the retailer, the overall total cost of implementation can be substantial. There is thus considerable interest in finding a lower cost alternative capable of providing the same, if not better, functionality.

SUMMARY

The present invention provides a system for providing retailer-controllable access to consolidated inventory management services from a retail worker's personal mobile device, such as a personal smartphone. The system—operable largely within and through the retailer's private computing network—comprises a plurality of data nodes, an enterprise service bus, and a device application. Inventory-related data is kept in the data nodes, with access thereto from suitably provisioned personal mobile devices being moderated by the enterprise service bus pursuant to retailer defined policies and parameters. Provisioning the personal mobile device involves installation thereon of the device application. The device application is engineered to launch a user interface for accessing the data nodes through the enterprise service bus, and thereby, enabling the use on the personal device of retailer-specific, job-related inventory management tools. The device application is authenticated preferably prior to and in the course of use.

In its preferred embodiment, the system comprises data nodes, the enterprise service bus, and the device application. Each data node hosts inventory-related data and is capable of providing a filtered set of its inventory-related data in response to an authenticated service request. The enterprise service bus is engineered to receive service requests from personal mobile devices, authenticating them, and passing the authenticated service request onto a pre-determined one or more of the data nodes. On the return, the enterprise service bus is also engineered to acquire the filtered sets of inventory-related data from the data nodes and providing it back to the appropriate personal mobile devices. The device application is installed on personal mobile devices, hosted on the native operating systems thereof. The device application is engineered to provide a user interface for (a) sending service requests to the enterprise service bus and (b) displaying on the device the filtered sets of inventory-related data sent back from the data nodes through the enterprise service bus in response to the service requests.

By adopting the inventive system, a retailer can reduce the often substantial costs associated with equipping and training inventory workers, meeting thusly a principal objective of the invention.

It is another object of the invention to provide means for accessing inventory-related data remotely from a personal mobile device.

It is another object of the invention to provide a system for accessing inventory-related data from a personal mobile device, wherein access is moderated by an enterprise service bus.

It is another object of the invention to provide retailer-controllable access to consolidated inventory management services from a worker's personal smartphone.

It is another object of the invention to provide a device application capable of being installed onto a personal smartphone and thereby providing a user interface for communicating with remote inventory-related data nodes.

It is another object of the present invention to provide a device application capable of sending service requests to inventory-related data nodes, wherein the service requests include "merchandise-related", "pick-related", "worker-related", and "print-related" services.

For a further understanding of the nature and objects of the invention, reference should be had to the following description taken in conjunction with the accompanying drawings.

BRIEF DESCRIPTION OF THE DRAWINGS

FIG. 1 illustrates schematically a system for providing access through the internet 5 to consolidated inventory management services provided by data nodes 30a, 30b, and 30c from a personal mobile device 20 through an enterprise service bus 10.

DETAILED DESCRIPTION

The present invention provides a system for providing retailer-controllable access to consolidated inventory management services through a retail worker's personal mobile device. The system is operable largely within and through the retailer's private computing network. As shown in FIG.

1, it comprises a plurality of data nodes 30a, 30b, and 30c (i.e., a data center), an enterprise service bus 10, and a device application installed on the personal mobile device 20. The data nodes 30, preferably deployed and aggregated within the network, are responsible for hosting the retailer's inventory-related data and providing individually or collectively a filtered set of the inventory-related data in response to an authenticated service request.

The enterprise service bus 10, preferably operating at the network edge, is configured for moderating the back and forth traffic of service requests and responses to and from the personal mobile device 20 and the data centers 30. The enterprise service bus 10 receives service requests from the personal mobile device 20 and forwards the authenticated ones on to a pre-determined one or more of the data nodes 30. On the return, the enterprise service bus 10 acquires the filtered set of inventory-related data from the data node(s) and passes it onto the originating personal mobile device.

In its native state, the personal mobile communication devices 20 of the types used for the invention are unable to meaningfully exchange data with and through the enterprise service bus 10. Accordingly, an extrinsic device application is installed thereon to provide the requisite additional functionality, such as a user interface with supporting communication protocols, service request modules, security and authentication agents, and like instructions and scripts.

In particular, the device application is hosted on the native operating system of the personal mobile communication device 20 and coded to provide a user interface for (a) sending recognizable service requests to the enterprise service bus 10 and (b) presenting the responsive filtered set of inventory-related data sent back from the data centers 30 through said enterprise service bus 10.

To reduce retail equipment and training costs, the personal mobile device 20 is selected from a group consisting of common consumer grade, mass marketed handheld digital computing devices with integrated internet connectivity. Enterprise grade, industrial grade, and custom engineered mobile devices are unlikely to be personally sought, owned, or used by retail workers outside the scope of their employment, and thus, equally unlikely to afford any relevant economic advantage under the present invention.

The most commonly owned handheld digital computing device is currently the smartphone, having recently been reported to hold greater than 50% of total mobile phone subscriptions in the United States. Smartphones are thus singularly the most, if not exclusively, preferred device for the invention. They are apparently widely used and owned, and are often carried by or kept close to individual owners at virtually all times at all locations, at their places of employment and outside. Moreover, through frequent prior personal use, retail workers would likely already be familiar with the downloading, installation, and operation of "apps" on their personal smartphones, promoting productivity in use and reducing training costs.

Commercially-available smartphones include, but are not limited to, the Apple "iPhone" (available from Apple Inc., Cupertino, Calif.), the Samsung "Galaxy" (available from Samsung Electronics Co., Ltd. of Suwon, South Korea), the Motorola "Droid" (available from Motorola Mobility Holdings, LLC, of Libertyville, Ill.), the HTC "One" (available from HTC Corporation of Taoyuan City, Taiwan), and the LG "Optimus" (available from LG Electronics of Seoul, South Korea). Aside from smartphones, other personal mobile devices that can be used for the invention include the Apple "iPad" and "iPad Mini" tablets, the Google "Nexus" tablets (available from Google Inc. of Mountain View, Calif.), the Microsoft "Surface" tablets (available from Microsoft Corporation of Redmond, Wash.), and the Motorola "Xoom" tablets.

Typical components of a smartphone include, for example, a processor, a touch sensitive display, a physical or on-screen keyboard, wireless communications circuits and connectivity (e.g., WiFi, GSM, 3G, 4G, TDMA, CDMA, Bluetooth, etc.), solid state data storage, speakers, and a power source. For several embodiments of the present invention, an integrated digital camera is included. In these embodiments, the integrated digital camera is used as an optical bar code scanner, driven by the inventive device application. Bar code scanning is important, if not critical, in respect to the performance of picking task, price checking, product information and history searching, and other like retail inventory service requests wherein potentially relevant data is encoded within scannable optical indicia.

As is known, commercially-available personal mobile devices 20 are sold to end users with a default set of applications already installed onto these devices' native operating systems. While these standard applications are varied and useful, as suggested above, none are known to provide the specific functionality needed for the invention. Accordingly, specific functionality is introduced though extrinsic software (i.e., an "app") developed for and installed onto the native operating system of the personal mobile device.

As used herein, the term "native operating system" includes the operating system provided by the device manufacturer and all updates, versions, patches, upgrades, modifications, additions, and revisions thereto that are provided, developed, or authorized by the original manufacturer. For smartphones, commonly used native operating systems include, for example, the "iOS" operating system (i.e., the propriety OS used for Apple "iPhones"); the "Android" operating system (i.e., a Linux-based operating system developed and licensed primarily by Google, Inc.); and "Windows Mobile" (i.e., a proprietary mobile operating system developed by Microsoft Corporation.)

As a practical matter, different versions of the device application—whilst providing to the user substantially similar functionality—will be developed for each mobile operating system targeted by the retailer for support. Thus, for example, an "iPhone" compatible version of the device application will be provided to support retail workers with Apple smartphones; an "Android" compatible version, for workers with "Android"-based phones; and a "Windows Mobile" version, for those with "Windows"-based phones.

In an alternative embodiment of the invention, the device application is "wrapped" in a device agnostic container that would essentially allow a single version of the device application to work on virtually any device with a mobile browser, often relying upon open HTML standards, open application interfaces, and/or cloud computing technologies. Web-based, device agnostic mobile apps, platforms approaches, and the development thereof, are known in the art.

The principal function of the device application is to use the extant resources within, and functionality of, the personal mobile device to provide a user interface capable of serving as a front end portal into the retailer's data center. The worker, though the user interface, is provided with the means to issue predefined service requests and receive back responsive data. The service requests are predefined by the retailer to encompass commonly requested tasks encountered in the course of performing worker responsibilities. Each service request is enabled through programming, data, codes, and algorithms, the relevant output of which is transmitted to the enterprise service bus 10 for further processing.

The enterprise service bus 10 provides a consolidated avenue for data to be exchanged, pursuant to retailer-defined rules and policies, between the data centers on one side and personal mobile devices on the other. At the outset, processing at the enterprise service bus involves data authentication and routing. The enterprise service bus is preferably deployed securely through the use of SOA network appliances and/or middleware capable of providing XML-based or JSON-based web services, such as the "WebSphere DataPower" SOA appliance commercially available from IBM Corporation (Armonk, N.Y.), or the Oracle "Fusion Middleware 11g" family of products commercially available from Oracle Corporation (Redwood City, Calif.).

In addition to routing and authentication, the enterprise service bus 10 is provided with means for mediating and accommodating the different data formats used by potentially different personal mobile device platforms and potentially different data node platforms. This can be accomplished by converting, transforming, or translating between endpoint data formats, and/or by enforcing policies, and/or by adopting a unified middleware data format. Other approaches will be known to those skilled in the art.

Details of the operation and design of the enterprise service bus 10 and alternatives thereto can be found, for example, in U.S. Pat. App. Pub. No 2011/0125821, filed by W. A. Roshem on Nov. 24, 2009; U.S. Pat. No. 8,156,140, issued to W. A. Roshem et al. on Apr. 10, 2012; U.S. Pat. No. 8,255,375, issued to A. Rangarajan et al. on Aug. 28, 2012; U.S. Pat. No. 8,112,434, issued to W. R. Patten, Jr. et al. on Feb. 7, 2012; and U.S. Pat. No. 8,265,970, issued to P. M. Conroy et al. on Sep. 11, 2012.

In the preferred embodiment of the invention, the functionality of the enterprise service bus is divided into "external" and "internal" components. The external service bus component 12 executes outside an internal firewall of the retailer's computing network. The internal service bus component 14 executes inside the firewall. Preferably, routing and data exchange are executed at both the external and internal enterprise service buses 12 and 14 in compliance with a secure communications protocol (e.g., HTTPS). The internal enterprise service bus should also be compliant with simple object access protocol (i.e., SOAP).

The external service bus component 12 serves essentially as the gateway for worker-originated service requests arriving through the internet from the worker personal mobile device. Outside the firewall, the external service bus component is primarily responsible for authenticating the device application and the personal mobile device being utilized. This authentication is performed essentially to ensure that application and device are adequately compliant with the relevant security and technical policies promulgated by the retailer for the inventive system. In the currently preferred embodiment, this is accomplished through and in combination with mobile security services provided by external agencies such as, for example, the mobile security service commercially offered by AirWatch, LLC (Atlanta, Ga.). Extrinsic information produced in the course of receiving such service will be called by, and relied upon, by the external enterprise service bus. Once authenticated, the service request is then allowed into retailer's network, past the firewall, for further processing by the internal service bus, thereby providing exposure to the enterprise services made available at the data nodes.

The internal service bus component 14 is responsible for maintaining maps, registries, tables, directories, addresses and the like for each of the data nodes in the data center that are to be called upon in response to worker service requests. Such information is used by the internal service bus component to route authentication service requests and store service requests. In this regard, the identity of each worker authorized to use the inventive service is preferably recorded at one data node (e.g., a retail facility database). Prior to providing access to that worker to other data nodes (e.g., product databases at a remote centrally-located "home office"), authentication of that worker is required.

Each of the data nodes 30a, 30b, and 30c can comprise one or more data storage devices capable of recoding digital information from a medium (e.g., magnetic, optical, semiconductor, etc.). For small to medium-sized retailers, the data nodes can utilize storage with comparatively modest capacity. For large global retailers, the data storage will require greater capacity and bandwidth, and thus, may employ several networked and attached electronic data storage components, these being deployed at an enterprise-scale and may include, for example, arrays of data servers and file servers; SAS and NAS storage facilities; raid storage systems; data backup, archiving, and redundancy facilities; and data management and load balancing agents.

For large enterprises, variation is expected in respect of the protocols, architecture, specifications, processes, operations, and hardware used at each of the data nodes. The issues of interoperability often associated with such complex and heterogeneous landscapes are resolved largely through the enterprise service bus 10.

The data nodes 30—as is true also for the enterprise service bus 10—are deployed within the retailer's computer network. This network itself can comprise a plurality of interconnected computers and terminals, servers, hubs, routers, switches, network security devices, network management devices, wireless nodes and access points, load balancers, and related software.

In respect of functionality, the data nodes 30 are individually and collectively responsible for the storage and retrieval of inventory-related data. In addition to reading and writing data, other integral and/or related functions of the data nodes include organizing, structuring, shaping, and linking data; access management and authentication; data integrity, backup, and security; data searching and reporting; and data processing and computational analysis. Such functionality can be provided intrinsically or extrinsically through software, hardware, or combinations thereof.

In preferred embodiments of the invention, the inventory-related data in each of the data nodes 30 is effected through programming within the system that provides a data access layer, a business logic/library layer, and a service bus layer. The data access layer manages access to the inventory-related data The business logic/library layer contains business logic and libraries used for processing and maintaining the integrity of the inventory-related data. The service bus layer exposes, in association with the data access layer and the business logic/library layer, predefined selections of the business logic and libraries to the enterprise service bus. In embodiments wherein the enterprise service bus is divided into internal and external functionalities, the service bus layer preferably exposes these selections to the latter, i.e., the external service bus component 12.

The specific type of service requests encompassed by the present invention is subject to variation. Retailers differ widely in their merchandise, sales and marketing strategies, customer base, organizational structure, operating procedures, and in several other respects. The records that are kept, and the manner and form in which they are kept will reflect this variation. Regardless, for purposes of the present invention, certain broad classes of service requests that have pertinence to inventory management in the retail industry in general can be defined. These classes of service requests, encompassed within the scope of the invention, include: Merchandise-related service requests, worker-related service requests, pick-related service requests, and print-related service requests.

The term "merchandise-related service requests" as used herein encompasses any service that call for the creation, editing, retrieval, and processing of records, data, files, and information kept in the normal course of business with respect to items of merchandise sold or otherwise handled by the retailer. Such records would include, but is not limited to, product information (e.g., brand, weight, dimensions, volume, class of goods, manufacturer, product codes, product identification numbers, product images, storage requirements, color and size) and sales information (e.g., price, cost, sales history, vendors, suppliers, distributors, quantity and location in inventory, quantity and location on shelves, stocking information, and marketing and promotional data). Examples of services that call upon such records would include, for example, retrieving product information, retrieving a product's location within a store; looking up an alternative item of merchandise; placing an order for an out-of-stock item; and updating the "on hand" quantity of or shelf capacity for an item of merchandise, which may trigger a corresponding worker-related service request therefor.

The term "worker-related service requests" as used herein encompasses any service that calls for or involve the creation, editing, retrieval, and processing of worker records, data, information, files, schedules, and assignments. Representative worker-related service requests would include, but is not limited to, the reassignment of workers to different departments or retail locations, the viewing of current worker assignments and tasks, the viewing of worker schedules, the assignment of a specific task (e.g., restocking a particular item at a particular location) to a specific worker (e.g., by name, identification number, skill, or availability); and approving or rejecting worker assignment and/or scheduling requests.

The term "pick-related service requests" as used herein encompasses any services that call for the creation, editing, monitoring, and deletion of retail pick tasks. As is well known in retail industry, "picking" involves the retrieval and transport of items of merchandise from one retail location (e.g., a warehouse location, backroom storage, receiving dock, etc.) to another location (e.g., an order fulfillment facility, store shelves, a warehouse location, etc.). When tasked as such, an assigned picker travels to and between the locations, searches for items, retrieves them, and directs them towards further downstream sorting, shipping, in-take, and/or shelving processes.

The term "print-related service requests" as used herein encompasses any service that call for the production of a report, hardcopy, printout of information culled from the data nodes through the inventive system and printed on a devices mapped at, within, or available to the data nodes. The specific principal service encompassed under this category is the printing for re-labeling of shelf labels which—as is well known—is a common and frequent daily retail task.

In performing a service request, it will be appreciated that the inventive system may call upon more than one data node. For example, in performing a request to print a new shelf label, information may be extracted from a data node containing merchandise-information, a data node containing sales information, a data node containing application authentication information, and a data node containing printer mapping information. As indicated above, the composition and orchestration of such processes will largely be handled by the enterprise service bus.

Although several embodiments of the invention are disclosed herein, those skilled in the art having the benefits of this disclosure can effect modifications thereto. These modifications are to be construed as encompassed within the scope of the present invention as set forth in the appended claims.

The invention claimed is:

1. A system providing access to consolidated inventory management services through a personal mobile device, the system comprising:
   a plurality of data nodes, each data node hosting inventory-related data, each capable of providing a filtered set of its inventory-related data in response to an authenticated service request;
   an enterprise service bus capable of receiving a service request from said personal mobile device, authenticating the service request, and enabling access to a private network based on the authentication and providing the authenticated service request to a pre-determined one or more of said data nodes in the private network, the enterprise service bus further capable of acquiring said filtered set of inventory-related data and providing it to said personal mobile device by exposing through a service bus layer, in association with a data access layer and a business logic/library layer, predefined selections of business logic and libraries to the external enterprise service bus; and
   a device application installed on the personal mobile device, wherein the device application is hosted on a native operating system of the personal mobile device, wherein the personal mobile device comprises an integrated digital camera with the device application using the integrated digital camera as an optical bar code scanner to identify a product with product identification information being communicated to one or more data nodes in acquiring relevant information corresponding to the service request, and is executable by a user to provide a user interface for (a) sending said service request to the enterprise service bus and (b) presenting the filtered set of inventory-related data sent back through said enterprise service bus to said device in response to said service request;
   wherein said enterprise service bus comprises:
   an external service bus component executing outside an internal firewall of a retailer-operated computing network; and
   an internal service bus component executing inside said internal firewall and comprising maps and registries that are accessed to identify the pre-determined one or more of said data nodes and define the routing of the authentication service requests;
   wherein the service request comprises a worker-related service request.

2. The system of claim 1, wherein the device application is wrapped in a device-agnostic container installed on the native operating system of the personal mobile device.

3. The system of claim 1, wherein:
   said personal mobile device is a smartphone with the integrated digital camera, and said device application is a smartphone app capable of using said integrated digital camera as the optical bar code scanner.

4. The system of claim 3, wherein the smartphone app is an internet app capable of communicating with said enterprise service bus through secure hypertext transfer protocol (HTTPS).

5. A system providing access to consolidated inventory management services through a personal mobile device, the system comprising:
   a plurality of data nodes, each data node hosting inventory-related data, each capable of providing a filtered set of its inventory-related data in response to an authenticated service request;
   an enterprise service bus capable of receiving a service request from said personal mobile device, authenticating the service request, and enabling access to a private network based on the authentication and providing the authenticated service request to a pre-determined one or more of said data nodes in the private network, the enterprise service bus further capable of acquiring said filtered set of inventory-related data and providing it to said personal mobile device, wherein said enterprise service bus comprises: an external service bus component executing outside an internal firewall of a retailer-operated computing network; and an internal service bus component executing inside said internal firewall and comprising maps and registries that are accessed to identify the pre-determined one or more of said data nodes and define the routing of the authentication service requests; and
   a device application installed on the personal mobile device, wherein the device application is hosted on a native operating system of the personal mobile device, wherein the personal mobile device comprises an integrated digital camera with the device application using the integrated digital camera as an optical bar code scanner to identify a product with product identification information being communicated to one or more data nodes in acquiring relevant information corresponding to the service request, and is executable by a user to provide a user interface for (a) sending said service request to the enterprise service bus and (b) presenting the filtered set of inventory-related data sent back through said enterprise service bus to said device in response to said service request;
   wherein the inventory-related data in each of said data nodes is supported through programming providing
   a data access layer for managing access to said inventory-related data;
   a business logic/library layer containing business logic and libraries used for processing and maintaining integrity of said inventory-related data; and
   a service bus layer exposing, in association with said data access layer and said business logic/library layer, predefined selections of said business logic and libraries to said enterprise service bus;
   wherein the service request comprises a worker-related service request.

6. The system of claim 5, wherein the service bus layer exposes said predefined selections of said business logic and libraries to the external service bus component of said enterprise service bus.

7. The system of claim 5, wherein said external service bus component performs an authentication procedure to authenticate a device application originating a service request.

8. The system of claim 7, wherein said authentication procedure calls and relies upon extrinsic third party information.

9. The system of claim 6, wherein:
   said personal mobile device is a smartphone with the integrated digital camera, and said device application is a smartphone app capable of using said integrated digital camera as the optical bar code scanner.

10. The system of claim 9, wherein the smartphone app is an internet app capable of communicating with said enterprise service bus through secure hypertext transfer protocol (HTTPS).

11. The system of claim 3, wherein said device application is capable of sending a plurality of predefined inventory-related service requests to said enterprise service bus, said plurality including:
   (a) a merchandise-related service request; and
   (b) a pick-related service request.

12. The system of claim 11, wherein said plurality of predefined inventory-related service requests further includes:
   (c) the worker-related service request, comprising a service request to view worker assignments of at least a first worker; and
   (d) a print-related service request.

13. The system of claim 10, wherein said device application is capable of sending a plurality of predefined inventory-related service requests to said enterprise service bus, said plurality including:
   (a) a merchandise-related service request; and
   (b) a pick-related service request.

14. The system of claim 13, wherein the enterprise service bus in receiving the service request is configured to receive a plurality of service requests comprising:
   (c) a worker-related service request, comprising a service request to view worker assignments of at least a first worker; and
   (d) a print-related service request.

15. The system of claim 1, wherein the internal service bus component maintains maps, directories and addresses for each of the data nodes that are to be called upon in response to the service request, wherein the maps, directories and addresses are used by the internal service bus component to route the authenticated service request.

16. The system of claim 5, wherein the internal service bus component maintains maps, directories and addresses for each of the data nodes that are to be called upon in response to the service request, wherein the maps, directories and addresses are used by the internal service bus component to route the authenticated service request.

* * * * *